United States Patent
Bing et al.

(10) Patent No.: US 8,525,653 B1
(45) Date of Patent: Sep. 3, 2013

(54) ANTI-THEFT SYSTEM FOR WHEELS AND RIMS

(76) Inventors: Wayne A. Bing, Upper Marlboro, MD (US); Candi R. Bing, Upper Marlboro, MD (US)

(*) Notice: Subject to any disclaimer, the term of this patent is extended or adjusted under 35 U.S.C. 154(b) by 654 days.

(21) Appl. No.: 12/769,867

(22) Filed: Apr. 29, 2010

(51) Int. Cl.
| | |
|---|---|
| *B60R 25/10* | (2013.01) |
| *G08B 1/08* | (2006.01) |
| *B60B 7/16* | (2006.01) |
| *B60Q 1/48* | (2006.01) |
| *B25B 23/00* | (2006.01) |
| *E05B 65/12* | (2006.01) |

(52) U.S. Cl.
USPC ........... 340/426.1; 340/426.24; 340/426.33; 340/429; 340/571; 340/425.5; 301/37.21; 116/28 R; 116/28.1; 70/260; 70/229; 70/258; 70/11; 70/12

(58) Field of Classification Search
USPC .......................................... 340/426.1
See application file for complete search history.

(56) References Cited

U.S. PATENT DOCUMENTS

| | | | |
|---|---|---|---|
| 4,648,293 A * | 3/1987 | McCauley | 81/436 |
| 4,875,819 A * | 10/1989 | Wilkinson | 411/432 |
| 5,019,803 A * | 5/1991 | Maram | 340/539.3 |
| 5,097,686 A | 3/1992 | Plumer | |
| 5,552,759 A * | 9/1996 | Stoyka | 340/426.33 |
| D379,428 S | 5/1997 | Fling | |
| 6,239,737 B1 | 5/2001 | Black | |
| 7,205,894 B1 * | 4/2007 | Savage | 340/568.6 |
| 7,360,700 B2 | 4/2008 | Parks | |
| 7,392,674 B1 | 7/2008 | Grote | |
| 2003/0165371 A1 * | 9/2003 | Notaro et al. | 411/402 |
| 2005/0126349 A1 * | 6/2005 | Trank et al. | 81/460 |
| 2006/0239018 A1 * | 10/2006 | Jardin | 362/459 |
| 2008/0061951 A1 | 3/2008 | Liu | |
| 2008/0272897 A1 * | 11/2008 | Honkonen et al. | 340/429 |

* cited by examiner

Primary Examiner — Jennifer Mehmood
Assistant Examiner — Fekadeselassie Girma

(57) ABSTRACT

A system for protecting vehicle wheels featuring a lug nut component for threading into a wheel; a keyhole disposed in the first end of the lug nut and a threaded second hole disposed in the second end; a sliding component disposed in the first hole biased in an up position and movable to a down position when a key is inserted; a sensor configured to detect the sliding component moving to the down position; a microprocessor operatively connected to the sensor; a transmitter operatively connected to the microprocessor; a receiver operatively connected to a car alarm system, wherein when the sensor detects the sliding component moving to the down position the transmitter sends an alarm signal to the receiver to activate the alarm system.

12 Claims, 5 Drawing Sheets

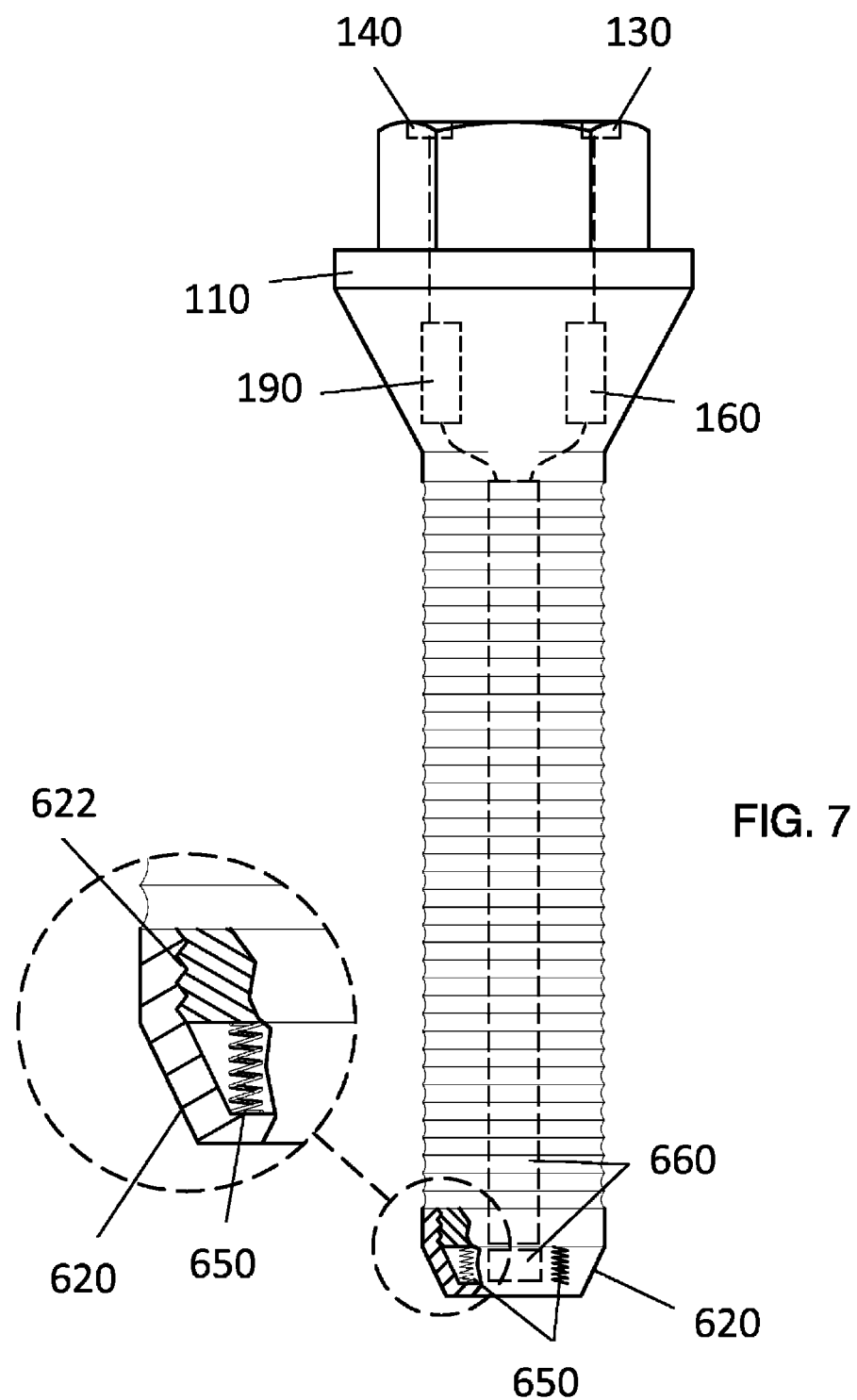

ANTI-THEFT SYSTEM FOR WHEELS AND RIMS

FIELD OF THE INVENTION

The present invention is directed to an anti-theft system for wheels and rims of a vehicle, more particularly to an anti-theft system comprising lug nuts with incorporated sensors for detecting potential theft of wheels and/or rims.

BACKGROUND OF THE INVENTION

Vehicle theft and vandalism is unfortunately an extremely common problem. The present invention features an anti-theft system for wheels and rims. The system of the present invention features lug nuts with incorporated sensors for detecting tampering and/or potential theft of the wheels and/or rims.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features anti-theft system for protecting wheels and rims of a vehicle. In some embodiments, the system comprises a lug nut component for threading into a lug nut slot of a wheel, the lug nut component having a first end and a second end; a first hole disposed in the first end of the lug nut component, wherein the first hole is a keyhole adapted to receive a key; a sensor spring disposed on the second end of the lug nut component; a threaded cap for securing in the lug nut slot, the threaded cap is adapted to receive the second end of the lug nut component, wherein the threaded cap and second end of the lug nut component sandwich the sensor spring and move the sensor spring from an extended position to a compressed position; a sensor operatively connected to the sensor spring, the sensor is configured to detect when the sensor spring moves from the compressed position to the extended position; a first microprocessor operatively connected to the sensor; a first transmitter operatively connected to the first microprocessor; and a second microprocessor operatively connected to a receiver, the second microprocessor is configured to be operatively connected to an alarm system of the vehicle.

In some embodiments, the system comprises a lug nut component for inserting into a lug nut slot of a wheel, the lug nut component having a first end and a second end; a first hole disposed in the first end of the lug nut component, wherein the first hole is a keyhole adapted to receive a key; a second hole disposed in the second end of the lug nut component, the second hole comprises threads adapted to engage threads of the lug nut slot of the wheel; a sliding component disposed at a bottom area of the first hole, the sliding component can slide upwardly and downwardly in the first hole between an up position and a down position, the sliding component is biased in the up position caused by a first spring, when a key is inserted into the first hole the key causes the sliding component to move from the up position to the down position; a sensor configured to detect movement of the sliding component from the up position to the down position; a first microprocessor operatively connected to the sensor; a first transmitter operatively connected to the first microprocessor; and a second microprocessor operatively connected to a receiver, the second microprocessor is configured to be operatively connected to an alarm system of the vehicle.

In some embodiments, the first microprocessor is configured to receive a first sensor input signal from the sensor when the sensor detects the sensor spring moving to the extended position. In some embodiments, the first microprocessor is configured to receive a first sensor input signal from the sensor when the sensor detects the sliding component moving to the down position.

In some embodiments, when the first microprocessor receives the first sensor input signal the first microprocessor generates a first transmitter output command to the first transmitter to cause the first transmitter to send a first alarm signal to the receiver. In some embodiments, the second microprocessor is configured to receive a first receiver input signal from the receiver when the receiver receives the first alarm signal whereupon the second microprocessor generates a first alarm system output command to activate the alarm system of the vehicle.

In some embodiments, the system further comprises a second transmitter operatively connected to the second microprocessor. In some embodiments, upon receipt of the first receiver input signal from the receiver the microprocessor is configured to generate a second transmitter output command to the second transmitter to cause the second transmitter to send a secondary alarm signal to a cellular phone network, a system in a user's home, a police system, or an internet system.

In some embodiments, the first hole is generally star-shaped. In some embodiments, the first microprocessor, the sensor, and the transmitter are each operatively connected to a power source. In some embodiments, the power source is a rechargeable battery. In some embodiments, the system further comprises solar cells operatively connected to the rechargeable battery. In some embodiments, the system further comprises a light component disposed at or near the first end of the lug nut component, the light component being operatively connected to the first microprocessor, wherein the light component functions to provide a visual indication that the system is activated.

In some embodiments, the second microprocessor is operatively connected to a camera system. In some embodiments, when the second microprocessor receives the first receiver input signal from the receiver, the second microprocessor generates a first camera output command to the camera to activate the camera, which causes the camera to record an attempted theft.

BRIEF DESCRIPTION OF THE DRAWINGS

FIG. 7 is a side cross sectional view of the lug nut component of FIG. 6.

DESCRIPTION OF PREFERRED EMBODIMENTS

Figure 1:
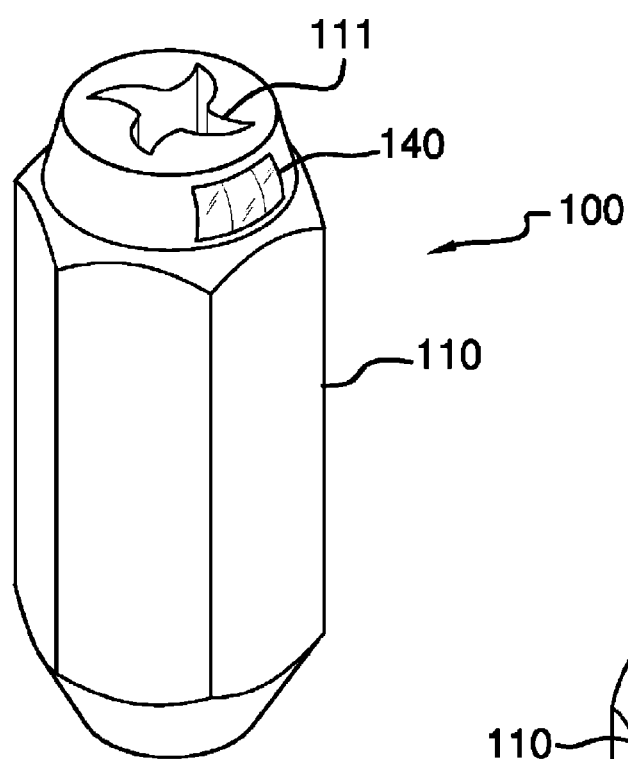
FIG. 1 is a top perspective view of a lug nut component of the anti-theft system of the present invention.
Figure 2:
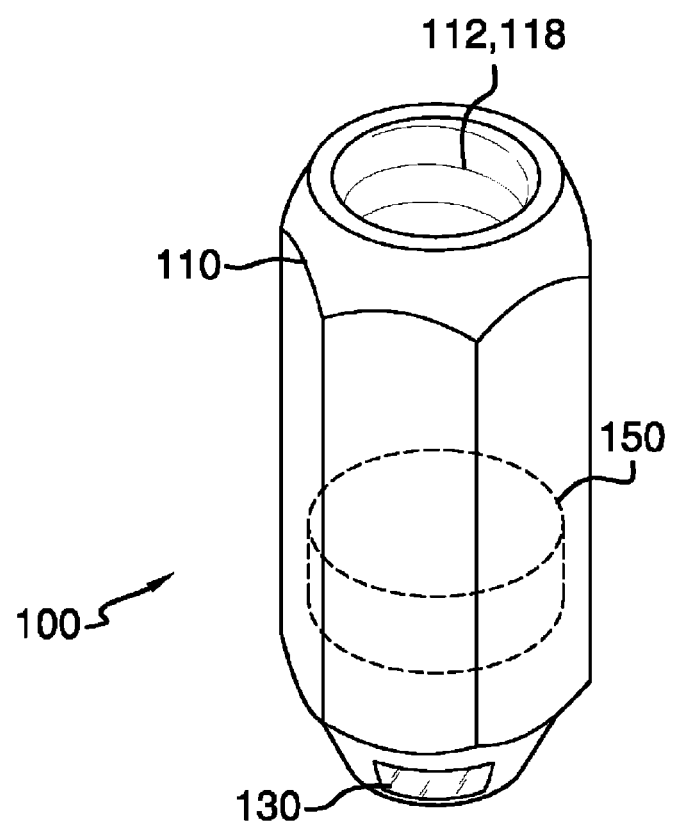
FIG. 2 is a bottom perspective view of the lug nut of FIG. 1.

Referring now to FIGS. 1-7, the present invention features an anti-theft system 100 for protecting wheels and rims of a vehicle. The system of the present invention may incorporate an existing alarm system in the vehicle.

The anti-theft system 100 of the present invention comprises a lug nut component 110 for attaching to a wheel in place of a standard wheel lug nut (e.g., on the threaded stud). The lug nut component 110 is similar to a standard wheel lug nut, which is well known to one of ordinary skill in the art. For example, the lug nut component 110 has is small but elongated, having a first end and a second end. In some embodiments, the lug nut component has a generally hexagonal shape, for example when viewed from above (see FIG. 3). In some embodiments, the lug nut component 110 is about 2 inches in length (as measured from the first end to the second end). In some embodiments, the lug nut component 110 has a diameter of about 2 inches. The lug nut components are not limited to the aforementioned dimensions. For example, in some embodiments, the lug nut component 110 is between about 0.5 and 1.0 inches in diameter. In some embodiments, the lug nut component 110 is between about 1.0 and 2.0 inches in diameter. In some embodiments, the lug nut component 110 is more than about 2.0 inches in diameter.

A first hole 111 is disposed in the first end of the lug nut component 110 and a second hole 112 is disposed in the second end of the lug nut component 110. The second hole 112 comprises threads 118 and is adapted to be screwed onto a wheel of a vehicle. When appropriately attached to the wheel of the vehicle, the first end of the lug nut component 110 is exposed (faces outwardly from the wheel).

In some embodiments, threads 618 are disposed on the outside portion of the lug nut component 110 near the second end (see FIG. 6, FIG. 7) instead of a second hole 112 with threads 118 being disposed in the second end of the lug nut component 110. A threaded cap 620 may be attachable to the second end of the lug nut component 110. As shown in FIG. 7, the second end of the lug nut component 110 cap screws into the threaded cap 620 (e.g., threads 620 of the threaded cap 620 engage the second end of the lug nut component 110.

Figure 3:
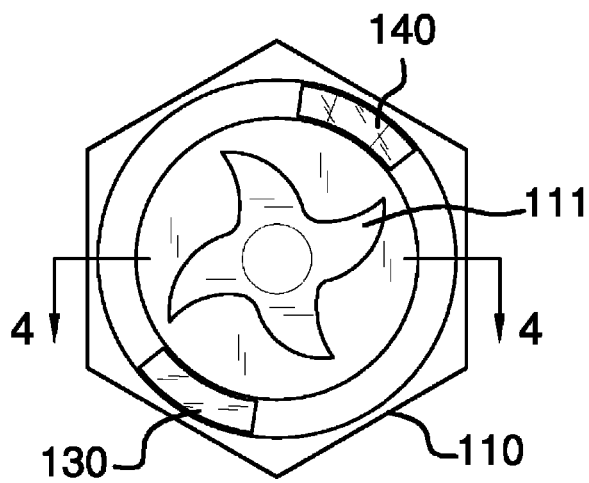
FIG. 3 is a top view of the lug nut of FIG. 1.
Figure 4:
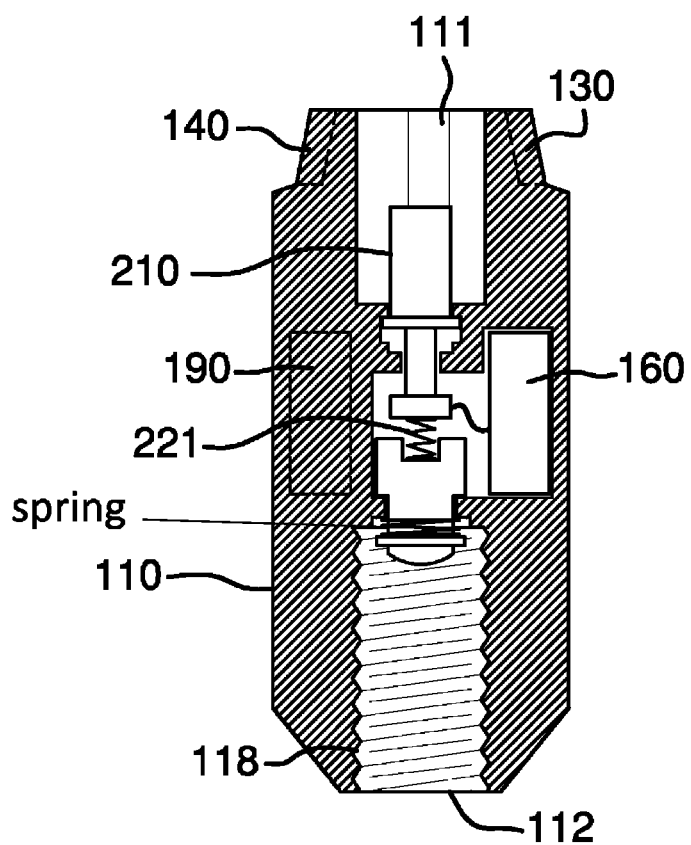
FIG. 4 is a side cross sectional view of the lug nut of FIG. 1.
Figure 5:
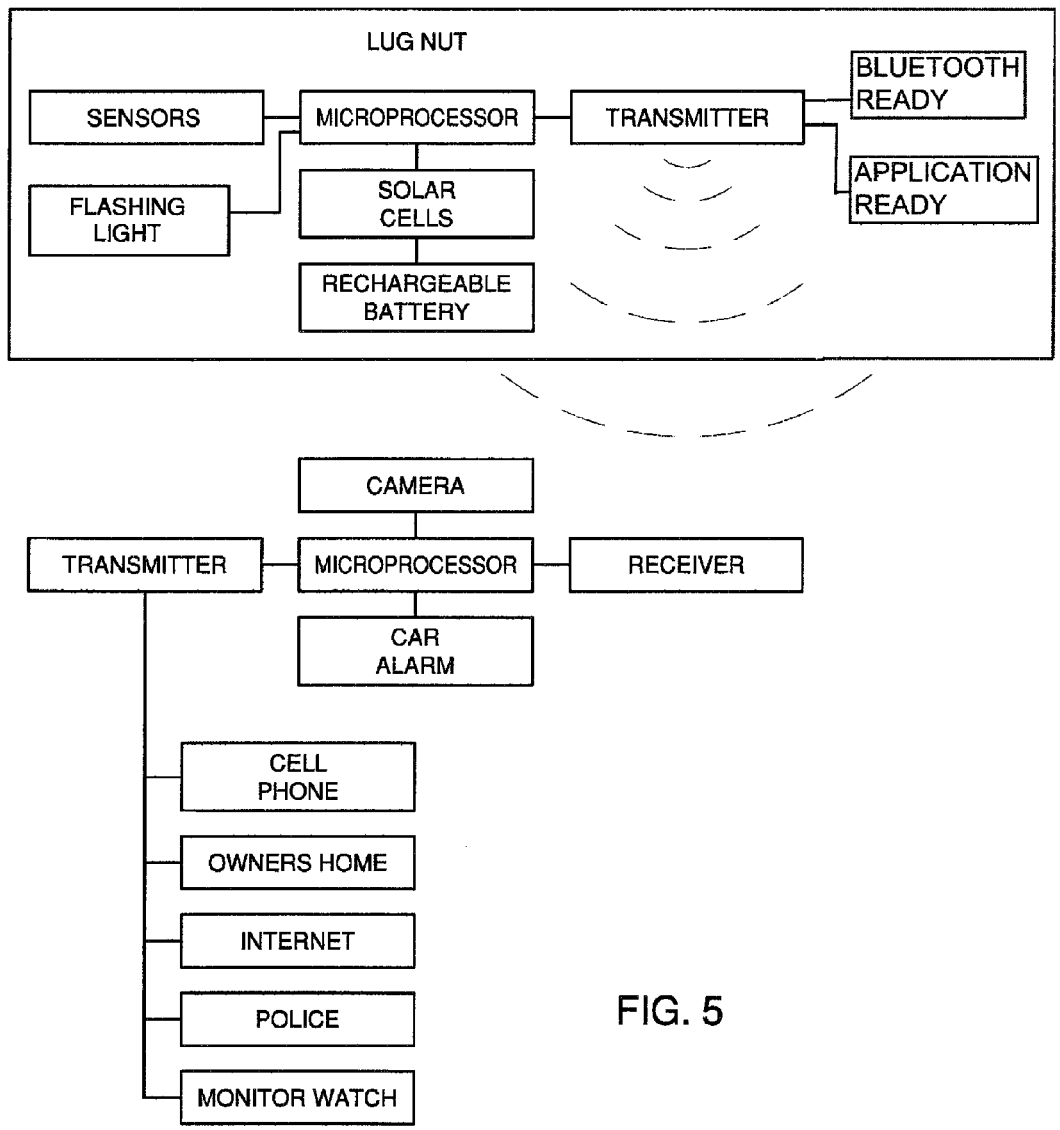
FIG. 5 is a schematic representation of the electrical components of the anti-theft system present invention.
Figure 6:
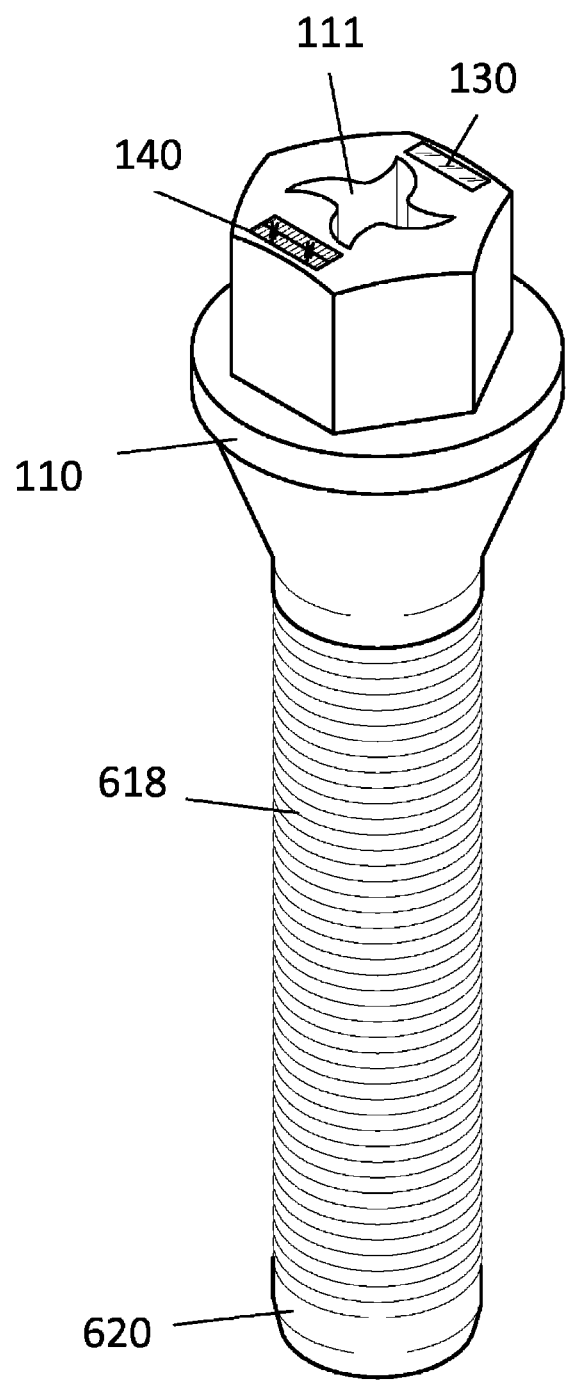
FIG. 6 is a perspective view of an alternative embodiment of the lug nut component of the anti-theft system of the present invention (e.g., European-style lug nut).

The first hole 111 in the lug nut component 110 is a grooved keyhole adapted to receive a key. Keyholes and their respective keys are well known to one of ordinary skill in the art. The key and corresponding keyhole (e.g., first hole 111) do not need to be shaped like standard keys for doors but can resemble any shape. As an example, the first hole 111 as shown in FIG. 3 is somewhat star-shaped. The lug nut component 110 can be locked and unlocked via the keyhole (e.g., first hole 111) and corresponding key. Key mechanisms are well known to one of ordinary skill in the art. In some embodiments, the lug nut component 110 is removed from the wheel via a push-and-turn mechanism, similar to the mechanism found in many gasoline caps. For example, when the key is inserted it is pushed inwardly and the key is simultaneously turned to turn the lug nut component 110 (and thus unscrew the lug nut component 110).

Disposed in the lug nut component 110 is a sensor 150 for detecting tampering of the lug nut component 110 (e.g., a potential theft). In some embodiments, the sensor 150 is a motion sensor or the sensor is activated via a specific activation system (e.g., a spring-loaded activation system, see below). The sensor 150 is operatively connected to a microprocessor disposed in the lug nut component 110, and the microprocessor is operatively connected to a transmitter 160. The microprocessor is configured to receive an input signal from the sensor 150 when the sensor 150 detects movement (e.g., potential theft). Upon receipt of the input signal from the sensor 150, the microprocessor is configured to send a first output command to the transmitter 160 to cause the transmitter 160 to send a signal to a receiver in a remote control component (e.g., with the user while he/she is away from his/her vehicle). In some embodiments, upon receipt of the input signal from the sensor 150, the microprocessor sends a second output command to the transmitter 160 to cause the transmitter 160 to send a signal to an alarm system to activate the alarm system (e.g., to scare off the thief).

The microprocessor, the sensor 150, and the transmitter 160 are each operatively connected to a power source. In some embodiments, the power source is a battery 190 (e.g., rechargeable battery). The battery 190 (e.g., rechargeable battery) may be operatively connected to a solar power source (e.g., one or more solar cells). Solar power sources (e.g., solar cells) are well known to one of ordinary skill in the art. In some embodiments, the solar power source (e.g., solar cell 140) provides charge to the battery 190 (e.g., rechargeable battery). The solar cell 140 may be disposed on the lug nut component 110 near or at the first end.

Disposed at or near the first end of the lug nut component 110 is a light component 130 (e.g., flashing light). The light component 120 functions to provide a visual indication that the system 100 is activated. The light component 130 is operatively connected to the microprocessor (and to the power source, e.g., battery 190).

Spanning the lug nut component 110, for example from the first hole 111 to the second hole 112, is a spring-loaded activation system, which can activate the sensor 150. For example, a sliding component 210 is disposed in the first hole 111 (at the bottom end of the first hole). The sliding component 210 has a first end and a second end, wherein the first end faces outwardly (e.g., outwardly from the first hole 111). The sliding component 210 can slide upwardly and downwardly in the first hole 111 between an up position and a down position. The sliding component 210 is biased in the up position caused by a first spring 221 disposed on the second end. When the sliding component 210 is pushed downwardly, for example via a key, the first spring 221 is compressed and the sliding component 210 is moved to the down position. In some embodiments, the sensor 150 detects movement of the spring-loaded activation system, for example the sensor 150 detects movement of the sliding component 210 from the up position to the down position.

In the event of tampering or potential theft, the sensor 150 becomes activated (e.g., via sensing movement, via sensing movement of the sliding component 210, etc.) and sends a first input signal to the microprocessor. The microprocessor is configured to receive the first input signal and send a second output command to the transmitter 160 to cause the transmitter 160 to send a signal to a receiver operatively connected to a second microprocessor, which is operatively connected to the car alarm system of the vehicle (car alarm systems are well known to one of ordinary skill in the art). For example, upon receipt of the signal from the transmitter 160, the receiver sends a second input signal to the second microprocessor, which then sends an alarm output command to the car alarm system to activate the car alarm system.

In some embodiments, the second microprocessor is operatively connected to a camera system. Upon receipt of the second input command from the receiver, the second microprocessor may also send a third output command to the camera to activate the camera, which may record the attempted theft or tampering.

In some embodiments, the second microprocessor is operatively connected to a second transmitter, which is configured to send signals to various other systems, for example a cellular phone network (or wireless area network), an internet system, a police system, a watch system, a system in the owner's home, etc. This may alert the owner or the police to the potential theft. In some embodiments, the camera system can send information to a website or to a hard drive.

In some embodiments, a pinhole is disposed in the lug nut component 110 to allow oil to be added.

Referring to FIG. 7, the second end of the lug nut component 110 may screw into a threaded cap 620, wherein the second end of the lug nut component 110 and threaded cap 620 sandwich a sensor spring 650 (e.g., the sensor spring 650 is positioned between the second end of the lug nut component 110 and the threaded cap 620). The sensor spring 650 can move between a compressed position wherein the lug nut component 110 is threaded into the threaded cap 620 and an extended position wherein the lug nut component 110 does not compress the sensor spring 650. The sensor spring 650 is operatively connected to the sensor 660, which is configured to detect when the sensor spring 650 moves to the extended position (e.g., when the lug nut 110 is removed it fails to compress the sensor spring 650). When the sensor 660 detects the sensor spring 650 moving to the extended position, the sensor 660 sends a first sensor spring input signal to the microprocessor, whereupon the microprocessor sends output commands to activate an alarm system (and optionally alert the user), for example as described above.

In some embodiments, the first microprocessor is configured to receive a first sensor input signal from the sensor when the sensor detects the sensor spring moving to the extended position. In some embodiments, the first microprocessor is configured to receive a first sensor input signal from the sensor when the sensor detects the sliding component moving to the down position. In some embodiments, when the first microprocessor receives the first sensor input signal the first microprocessor generates a first transmitter output command to the first transmitter to cause the first transmitter to send a first alarm signal to the receiver. In some embodiments, the second microprocessor is configured to receive a first receiver input signal from the receiver when the receiver receives the first alarm signal whereupon the second microprocessor generates a first alarm system output command to activate the alarm system of the vehicle.

As used herein, the term "about" refers to plus or minus 10% of the referenced number. For example, an embodiment wherein the lug nut component 110 is about 2 inches in diameter includes a lug nut component 110 that is between 1.8 and 2.2 inches in diameter.

The following the disclosures of the following U.S. Patents are incorporated in their entirety by reference herein: U.S. Pat. No. 7,392,674; U.S. Pat. Application No. 2008/0061951; U.S. Pat. No. 7,360,700; U.S. Pat. No. 5,097,686; U.S. Pat. No. 6,239,737.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An anti-theft system for protecting wheels and rims of a vehicle, said system comprising:
   (a) a lug nut component for threading into a lug nut slot of a wheel, the lug nut component having a first end arid a second end;
   (b) a first hole disposed in the first end of the lug nut component, wherein the first hole is a keyhole configured to receive a key;
   (c) a sensor spring disposed on the second end of the lug nut component;
   (d) a threaded cap for securing in the lug nut slot, the threaded cap is configured to receive the second end of the lug nut component, wherein the threaded cap and second end of the lug nut component sandwich the sensor spring and move the sensor spring from an extended position to a compressed position; wherein when the lug nut component threads out of the lug nut slot of a wheel, the sensor spring moves from the compressed position toward the extended position;
   (e) a sensor operatively connected to the sensor spring, the sensor is configured to detect when the sensor spring moves from the compressed position to file extended position;
   (f) a first microprocessor operatively connected to the sensor;
   (g) a first transmitter operatively connected to the first microprocessor; and
   (h) a second microprocessor operatively connected to a receiver, the second microprocessor is configured to be operatively connected to an alarm system of the vehicle;
   wherein the first microprocessor is configured to receive a first sensor input signal from the sensor when the sensor detects the sensor spring moving to the extended position, wherein when the first microprocessor receives the first sensor input signal the first microprocessor generates a first transmitter output command to the first transmitter to cause the first transmitter to send a first alarm signal to the receiver, wherein the second microprocessor is configured to receive a first receiver input signal from the receiver when the receiver receives the first alarm signal whereupon the second microprocessor generates a first alarm system output command to activate the alarm system of the vehicle;
   (i) a rechargeable battery disposed within the lug nut component, wherein the rechargeable battery is operatively, connected to the first microprocessor, the sensor and the transmitter;
   a second transmitter operatively connected to the second microprocessor;
   wherein upon receipt of the first receiver input signal from the receiver the microprocessor is configured to generate a second transmitter output command to the second transmitter to cause the second transmitter to send a secondary alarm signal to a cellular phone network, a system in a user's home, a police system, or an internet system.

2. The system of claim 1, wherein the first hole is star-shaped.

3. The system of claim 1 further comprising solar cells operatively connected to the rechargeable battery.

4. The system of claim 1 further comprising a light component disposed at or near the first end of the lug nut component, the light component being operatively connected to the first microprocessor, wherein the light component functions to provide a visual indication that the system is activated.

5. The system of claim 1, wherein the second microprocessor is operatively connected to a camera system.

6. The system of claim 1, wherein when the second microprocessor receives the first receiver input signal from the receiver, the second microprocessor generates a first camera output command to the camera to activate the camera, which causes the camera to record an attempted theft.

7. An anti-theft system for protecting wheels and rims of a vehicle, said system comprising:
(a) a lug nut component for inserting into a lug nut slot of a wheel, the lug nut component having a first end and a second end,
(b) a first hole disposed in the first end of the lug nut component, wherein the first hole is a keyhole to receive a key;
(c) a second hole disposed in the second end of the lug nut component, the second hole comprises threads configured to engage threads of the lug nut slot of the wheel;
(d) a sliding component disposed at a bottom area of the first hole, the sliding component can slide upwardly and downwardly in the first hole between an up position and a down position, the sliding component is biased in the up position caused by a first spring, when a key is inserted into the first hole the key causes the sliding component to move from the up position to the down position: wherein when the lug nut component threads out of the lug nut slot of a wheel from the second hole, the sliding component moves to the down position;
(e) a sensor configured to detect movement of the sliding component from the up position to the down position;
(f) a first microprocessor operatively connected to the sensor;
(g) a first transmitter operatively connected to the first microprocessor; and
(h) a second microprocessor operatively connected to a receiver, the second microprocessor is configured to be operatively connected to an alarm system of the vehicle;
wherein the first microprocessor is configured to receive a first sensor input signal from the sensor when the sensor detects the sliding component moving to the down position;
wherein when the first microprocessor receives the first sensor input signal the first microprocessor generates a first transmitter output command to the first transmitter to cause the first transmitter to send a first alarm signal to the receiver wherein the second microprocessor is configured to receive a first receiver input signal from the receiver when the receiver receives the first alarm signal whereupon the second microprocessor generates a first alarm system output command to activate the alarm system of the vehicle;
(i) a rechargeable battery disposed within the lug nut component, wherein the rechargeable battery is operatively connected to the first microprocessor, the sensor and the transmitter;
a second transmitter operatively connected to the second microprocessor;
wherein upon receipt of the first receiver input signal from the receiver the microprocessor is configured to generate a second transmitter output command to the second transmitter to cause the second transmitter to send a secondary alarm signal to a cellular phone network, a system in a user's home, a police system, or an internet system.

8. The system of claim 7, wherein the first hole is star-shaped.

9. The system of claim 7 further comprising solar cells operatively connected to the rechargeable battery.

10. The system of claim 7 further comprising a light component disposed at or near the first end of the lug nut component, the light component being operatively connected to the first microprocessor, wherein the light component functions to provide a visual indication that the system is activated.

11. The system of claim 7, wherein the second microprocessor is operatively connected to a camera system.

12. The system of claim 7, wherein when the second microprocessor receives the first receiver input signal from the receiver, the second microprocessor generates a first camera output command to the camera to activate the camera, which causes the camera to record an attempted theft.

* * * * *